United States Patent

[11] 3,608,648

| [72] | Inventors | Floyd H. Dibble, Jr.<br>Roxbury, Conn.;<br>Ernest P. Holze, Jr., Brewster, N.Y. |
|---|---|---|
| [21] | Appl. No. | 41,127 |
| [22] | Filed | May 25, 1970 |
| [45] | Patented | Sept. 28, 1971 |
| [73] | Assignee | Branson Instruments, Incorporated<br>Stamford, Conn. |

[54] SONICALLY ACTUATED SHAFT WITH COOLANT JACKET
5 Claims, 4 Drawing Figs.

[52] U.S. Cl. .................................................. 173/57,
51/56, 31/59 SS, 173/171
[51] Int. Cl. ...................................................... B25d 11/00
[50] Field of Search........................................... 173/57, 58,
61–70, 104–108, 117, 171; 310/8.3, 8.2; 51/56, 59
SS, 165.9

[56] References Cited
UNITED STATES PATENTS

| 1,069,288 | 8/1913 | Prellwitz..................... | 173/57 |
| 2,292,867 | 8/1942 | Charles....................... | 173/57 |
| 3,132,702 | 5/1964 | Schrum, Sr. et al.......... | 173/57 |
| 1,704,053 | 3/1929 | Miller.......................... | 173/57 |
| 2,254,823 | 9/1941 | Kroll............................ | 173/117 |
| 3,015,914 | 1/1942 | Roney......................... | 51/56 |
| 3,204,707 | 9/1965 | Johnson...................... | 173/57 |
| 3,482,360 | 12/1969 | Legge......................... | 51/165.9 |

*Primary Examiner*—James A. Leppink
*Attorney*—Ervin B. Steinberg

ABSTRACT: A coolant jacket made of low-friction material, such as fluorocarbon, surrounds a portion of a shaft which is rotating while undergoing sonic oscillations along its longitudinal axis. The jacket includes flexible rims which move into and out of sealing contact with the shaft responsive to coolant pressure in the chamber formed between the jacket and shaft.

PATENTED SEP 28 1971
3,608,648
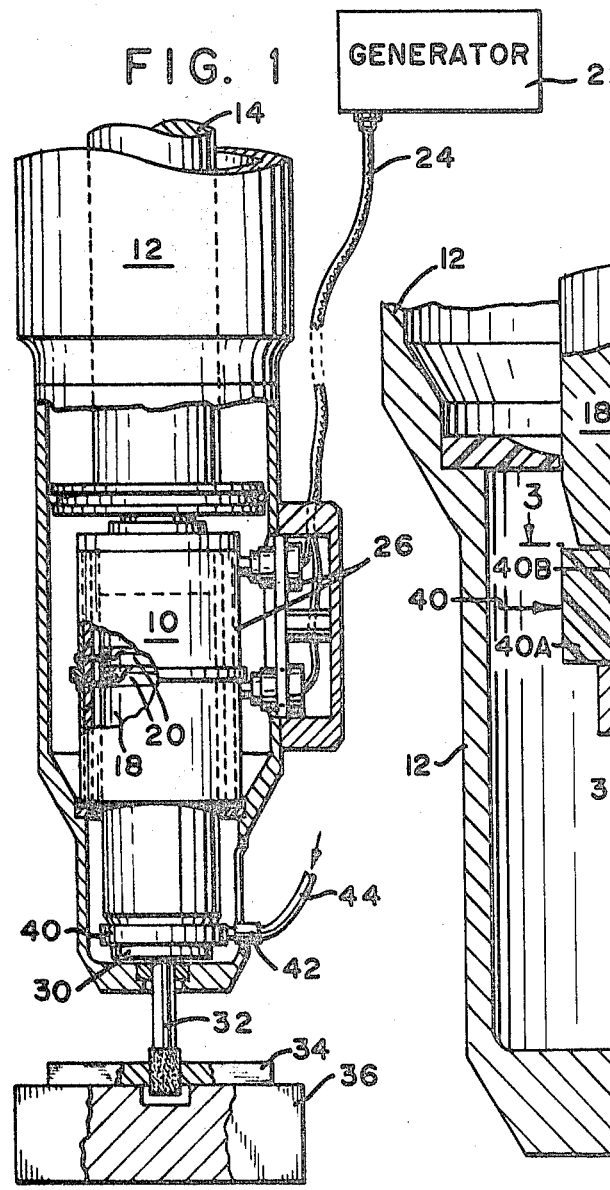
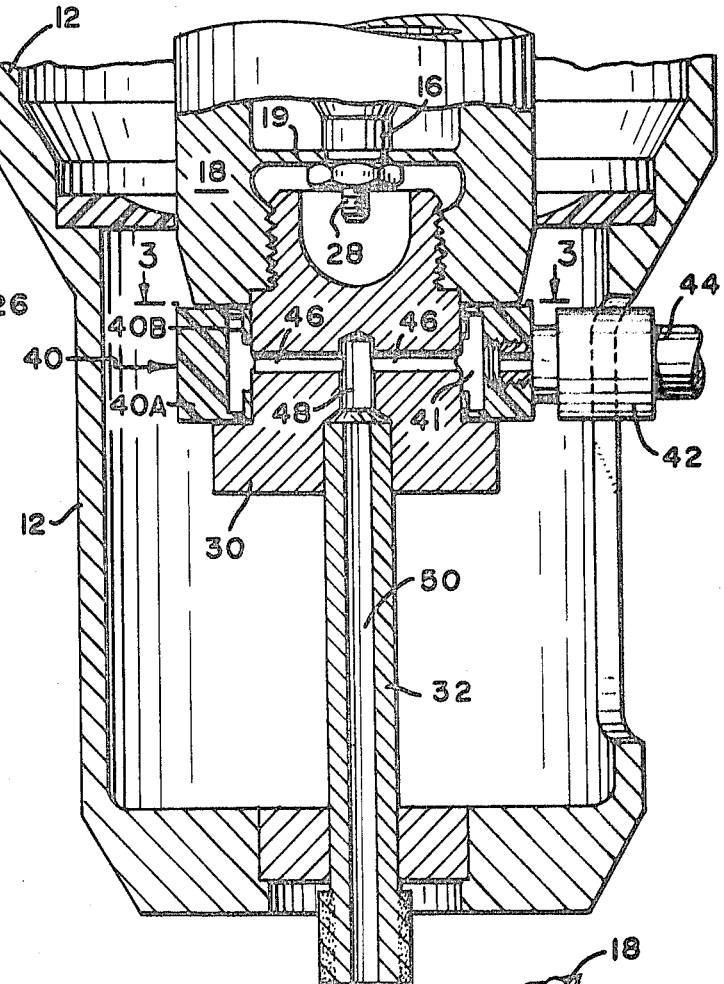
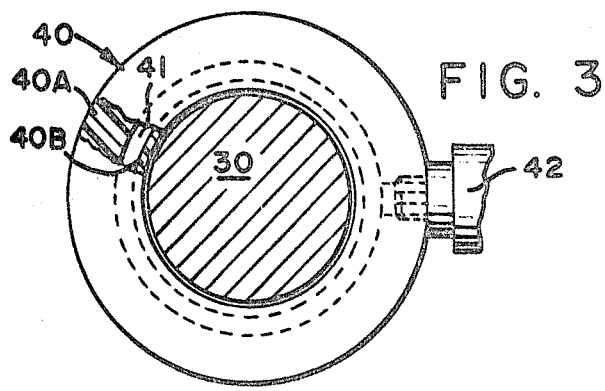
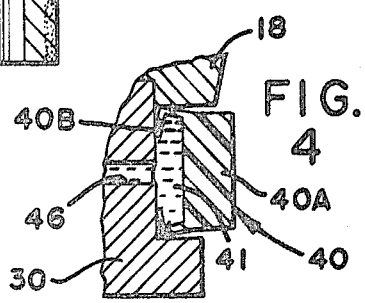
FLOYD H. DIBBLE, JR.
ERNEST P. HOLZE, JR.
INVENTORS.
BY:
Ervin B. Steinberg

SONICALLY ACTUATED SHAFT WITH COOLANT JACKET

This invention is related to ultrasonic machine tools as described, for instance, in U.S. Pat. No. 3,015,914 entitled "Machine Tool" issued to R. N. Roney on Jan. 9, 1962 and in U.S. Pat. no. 3,482,360 entitled "Ultrasonic Machining Apparatus" issued to P. Legge on Dec. 9, 1969. Moreover, this invention is related to copending applications for U.S. Pat. Ser. No. 888,468 filed Dec. 29, 1969 in the name of Andrew Shoh, entitled "Transducer for Ultrasonic Machine Tool" and Ser. No. 22,413 filed Mar. 25, 1970 in the name of Andrew Shoh, entitled "Ultrasonic Motion Adapter."

The above patents and patent applications disclose, generally, an ultrasonic machine tool in which a shaft carrying a tool bit is rotated while undergoing axial oscillation in the sonic or ultrasonic frequency range. The combined rotary and axial motion has been found to be most effective for machining hard and brittle materials, such as ceramics, glass, boron-epoxy laminates and the like. The tool bit, such as a diamond impregnated hollow core drill, is coupled to the shaft by means of a chuck, and a liquid coolant, such as water, is used for cooling and lubrication. Responsive to the rotary and axial motion applied to the shaft and to the chuck, the tool bit provides a very fast and remarkably successful cutting action.

As stated heretofore, a liquid coolant is employed, and for flushing away the debris caused during the cutting action, the coolant is introduced through the core of the tool bit. This forces the coolant into the machined cavity and raises the debris, chips and other loose matter to the surface of the workpiece, from where such matter is flushed away. The coolant, obviously, must be introduced under pressure and the coupling of the coolant to to the tool bit has created, in the past, considerable problems. The coolant, in a typical construction used heretofore, is introduced into the workpiece cavity by means of an annular water jacket which surrounds a portion of the machine tool shaft. The shaft is provided with a radial hole and a longitudinal bore along the center of the shaft conveys the coolant into the core of the tool bit. The rotating shaft and the simultaneous axial motion thereof cause an extremely high wear of the jacket and, in many cases, especially if the jacket is run dry as may occur by failure to turn on the coolant flow, the jacket may be ruined almost instantaneously. Even if the coolant is turned on and the jacket is operated under normal conditions, the life of the jacket in the past has been rather limited. Another problem concerns the fact that in order to avoid the high frictional excursion of the vibrating shaft, which usually vibrates as a resonator, the jacket in the past has been mounted to the nodal region of the longitudinal oscillations so that the coolant jacket would not be subjected to the large longitudinal oscillations of the shaft, but only to the radial expansion and contraction present in the nodal region. This, of course, causes a cyclic expansion and contraction of the jacket seal and results in a fast wear of the sealing surfaces.

The present invention overcomes the heretofore stated problems by providing an improved coolant jacket construction. As used hereafter the term "water jacket" has been adopted for the sake of simplicity, but it shall be understood that instead of water any other suitable coolant may be used.

The water jacket disclosed herein may be run dry or wet without experiencing a significant amount of wear of the sealing surfaces.

One of the principal objects of this invention is, therefore, the provision of a new and improved water jacket for use in connection with a rotating shaft which undergoes also oscillations in the axial direction at a sonic or ultrasonic frequency.

Another important object of this invention is the provision of a new and improved water jacket for a sonically actuated shaft, the water jacket being characterized by a high degree of reliability, low friction, and little wear.

Further and still other objects of this invention will be more clearly apparent by reference to the following description when taken in conjunction with the drawing, in which:

FIG. 1 is an elevational view, partly in section, of an ultrasonic machine tool including the water jacket according to the present invention;

FIG. 2 is an enlarged cross-sectional view of the frontal portion of the machine tool shown in FIG. 1;

FIG. 3 is a sectional view along line 3—3 in FIG. 2, and

FIG. 4 is an enlarged sectional view showing in an exaggerated manner the action of certain portions of the water jacket.

Referring now to the figures, and FIG. 1 in particular, numeral 10 identifies generally an ultrasonic adapter as disclosed in the patent application to A. Shoh supra. The adapter is mounted to a standard commercial tool such as a drill 12 which does not form a part of the present invention. A shaft 14, forming part of the drill 12, rotates under the influence of electric or pneumatic energy, and such rotation is applied to the ultrasonic adapter 10 and is transmitted to the narrowed output end 16 of the adapter, see FIG. 2. The ultrasonic adapter includes also a concentric sleeve 18 rotating with the shaft, see FIGS. 1 and 2, which is provided with a set of piezoelectric disks 20 which are energized from a high frequency generator 22 via a cable 24 and an electrical slip ring assembly 26.

Responsive to the high frequency electrical energy applied to the piezoelectric disks 20, the sleeve 18 is caused to undergo oscillations in the longitudinal direction and these oscillations may be in the sonic or the ultrasonic frequency range, but generally are in the ultrasonic frequency range, 16 kHz. or higher, in order to avoid disturbing audible noise. The sleeve 18 is dimensioned so that it resonates as a half wavelength resonator when energized with the frequency of predetermined value. The dimensioning of the resonator is well understood in the art and may be found in "Ultrasonic Engineering" (book) by Julian R. Frederick, John Wiley & Sons, Inc., New York, N.Y. (1965), pages 87 to 103.

The output end 16 of the rotating shaft, see FIG. 2, is coupled to the rotating and longitudinally oscillating sleeve 18 by means of horizontal diaphragm-type flange 19 and screw and nut fastening means 28. Hence, the sleeve and shaft form an assembly and may be considered as a single unit. A chuck 30 is threaded to the sleeve 18, and responsive to the combined motion of the shaft end 16 and sleeve 18, undergoes rotation as well as axial vibratory motion. The chuck 30 is provided with a diamond impregnated tool bit 32, having a hollow core 50.

As seen in FIG. 1, the tool bit is in contact with a workpiece 34 disposed on a platform 36.

Drills of the type indicated in FIG. 1 generally include automatic feed means (not shown) and, hence, the shaft 14 of the drill moves during drilling from a retracted position, FIG. 2, toward a forward position as shown in FIG. 1. It shall be understood that the precise construction of the ultrasonic motion adapter and that of the drill or machine tool to which the adapter is mounted are not material to the present invention.

The present invention, as will be more clearly described in the following, concerns itself primarily with the construction of a nonrotating water jacket which surrounds a rotating shaft subjected to high frequency motion in the axial direction. The water jacket 40 is held between the chuck 30 and the sleeve 18 by means of the respective radial recesses shown. The jacket 40 together with the chuck 30, which may be considered a part of the shaft, form an annular chamber 41 adapted to be pressurized with a liquid, such as water, by means of a fitting 42 and a fluid line 44, see FIGS. 1 and 2.

Water introduced into the chamber 41 is forced into the radial bores 46 of the chuck, into the axial bore 48 and into the hollow core 50 of the tool bit 32 from where the liquid is applied under pressure to the cutting surface for flushing away loose debris.

The water jacket 40 is made of material having a relatively low coefficient of friction with the rotating and oscillating chuck or shaft, and to this end the jacket is preferably made from fluorocarbon material such as "Teflon."

Moreover, the jacket has an outer body portion 40A from which a set of rims 40B extend. The rims 40B, each having a first radial surface and a second sealing surface extending along the longitudinal axis of the shaft, provide the liquidtight seal with the rotating ad oscillating shaft as will be more clearly apparent.

The rims 40B are constructed to be sufficiently thin and flexible so as to deform under the force of the liquid pressure, see FIG. 4, which illustration shows this action in an exaggerated manner, and to provide a liquidtight seal. As will be apparent, the greater the water pressure, the greater the force effective upon the rims 40B.

If the water jacket is run dry, that is without water, the pressure upon the rims diminished and little wear is experienced, specifically in view of the fact that the jacket is constructed as unitary device from a material having a very low coefficient friction with the rotating and resonating shaft. Additionally, in the event that a small amount of wear should occur after prolonged operation, the flexibility of the rims enables the remaining structure to compensate for such wear and to still achieve a liquidtight seal. Immediately when relieving the liquid pressure, the force exerted upon the rims is released also and the frictional contact is reduced.

Another most important feature of the present invention resides in the fact that the water jacket is not disposed at the nodal region of the longitudinal motion, but is mounted in an area where vibration along the longitudinal axis does occur. As is well known in the art sonic or ultrasonic vibrations greatly reduce frictional resistance between two parts and the longitudinal vibrations in the present construction reduce the frictional resistance between the shaft and the sealing surface of the jacket.

By virtue of the unique construction of the jacket, it is possible to mount the jacket 40 with a small amount of play between the sleeve 18 and the chuck 30 to permit a small amount of run out, should such be present, without affecting the ability of the jacket to provide a liquidtight seal with the rotating and oscillating shaft.

As shown in the present embodiment, the jacket 40 is adapted to move with the shaft and tool bit 32 within the housing of the drill 12 toward and away from the workpiece 34.

It will be apparent that the same type of water jacket construction can be used in connection with other ultrasonic machine tool embodiments. The ultrasonic tool adapter 10 and drill 12 described herein are merely illustrative of the general arrangement in which the present invention may be used.

As used in the following claims the term sonic shall denote high frequency oscillations in the sonic or ultrasonic frequency range.

What is claimed is:

1. The combination comprising:
 a shaft dimensioned to oscillate as a half wavelength resonator along its longitudinal axis at a predetermined frequency;
 means disposed for coupling sonic energy to said shaft to cause said shaft to undergo such oscillatory motion;
 a water jacket surrounding a portion of said shaft at a location outside the nodal plane of longitudinal motion occurring on said shaft, and said jacket providing an annular chamber about said shaft portion;
 means disposed on said jacket for filling said chamber with a liquid coolant under pressure;
 a pair of radially disposed rims on said jacket for engaging said shaft portion and made of a material having a substantially low coefficient of friction with said shaft portion, and
 said rims being sufficiently flexible to move into liquidtight sealing contact with said shaft portion responsive to the pressure of the coolant in said chamber whereby to effect a liquidtight seal between said jacket and shaft portion.

2. The combination as set forth in claim 1, said rims being made of fluorocarbon synthetic material.

3. The combination as set forth in claim 1, each of said rims being of L-shape having a first surface disposed along the radial axis of said shaft and a second surface disposed along the longitudinal axis of said shaft.

4. The combination comprising:
 a shaft dimensioned to oscillate as a half wavelength resonator along its longitudinal axis at a predetermined frequency and adapted to undergo rotation;
 means disposed for coupling sonic energy to said shaft to cause said shaft to undergo such oscillatory motion along its axial direction while rotating;
 a water jacket made of fluorocarbon material surrounding a portion of said shaft at a location outside the nodal plane of longitudinal motion occurring on said shaft, and said jacket providing an annular chamber about said shaft portion;
 means disposed on said jacket for filling said chamber with liquid under pressure;
 a pair of radially disposed rims forming an integral part said jacket engaging said shaft portion, and said rims being sufficiently flexible to move into liquidtight sealing contact with said shaft portion responsive to the pressure of the liquid in said chamber, and to move in a direction to release the sealing contact with said shaft portion in the absence of liquid pressure, and
 means for supporting said jacket substantially nonrotating about said shaft at said location outside the nodal plane.

5. The combination as set forth in claim 4, said shaft portion forming a chuck for a hollow core tool bit, and means for feeding liquid from said chamber through a cavity of said chuck to the core of said tool bit.